(12) United States Patent
Skinner et al.

(10) Patent No.: US 7,907,694 B2
(45) Date of Patent: Mar. 15, 2011

(54) ADAPTIVE CONTROL OF CLOCK SPREAD TO MITIGATE RADIO FREQUENCY INTERFERENCE

(75) Inventors: Harry Skinner, Portland, OR (US); Michael E. Delsher, Hillsboro, OR (US); Chaitanya Sreerama, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 11/860,374

(22) Filed: Sep. 24, 2007

(65) Prior Publication Data

US 2009/0080583 A1  Mar. 26, 2009

(51) Int. Cl.
  *H04L 7/00* (2006.01)
(52) U.S. Cl. ........ 375/371; 375/376; 375/373; 375/294; 375/215
(58) Field of Classification Search .................. 375/371, 375/376, 373, 294, 215
See application file for complete search history.

(56) References Cited

U.S. PATENT DOCUMENTS

| 5,745,848 | A | 4/1998 | Robin | |
|---|---|---|---|---|
| 7,437,590 | B2 * | 10/2008 | Decker et al. | 713/500 |
| 2003/0080792 | A1 | 5/2003 | Azmoodeh | |
| 2003/0198307 | A1 * | 10/2003 | Neill et al. | 375/346 |
| 2004/0203453 | A1 | 10/2004 | Vaananen | |
| 2005/0265486 | A1 * | 12/2005 | Crawley | 375/326 |
| 2006/0290434 | A1 | 12/2006 | Bettner et al. | |
| 2008/0137786 | A1 * | 6/2008 | Waltho | 375/346 |

FOREIGN PATENT DOCUMENTS

WO  99/49582 A2  9/1999
WO  2009/042431 A1  4/2009

OTHER PUBLICATIONS

International Search Report and written opinion for PCT Patent application No. PCT/US2008/076365, mailed Nov. 19, 2008, 10 Pages.
U.S. Appl. No. 11/169,365, filed Jun. 28, 2005.
U.S. Appl. No. 11/537,635, filed Sep. 30, 3006.
U.S. Appl. No. 11/694,171, filed Mar. 30, 2007.
U.S. Patent Application No. to be determined; filed Sep. 21, 2007.
International Preliminary Report on Patentability received for PCT Patent Application No. PCT/US2008/076365, mailed on Apr. 1, 2010, 6 pages.

* cited by examiner

*Primary Examiner* — Shuwang Liu
*Assistant Examiner* — Kabir A Timory
(74) *Attorney, Agent, or Firm* — Robert D. Anderson

(57) ABSTRACT

In some embodiments an adaptive clocking controller determines a clock spread of a system clock that would result in a lowest total interference between a channel received by a radio receiver and the system clock. A clock generator modifies a spread of the system clock in response to the determined clock spread. Other embodiments are described and claimed.

16 Claims, 6 Drawing Sheets

ADAPTIVE CONTROL OF CLOCK SPREAD TO MITIGATE RADIO FREQUENCY INTERFERENCE

TECHNICAL FIELD

The inventions generally relate to adaptive control of clock spread to mitigate radio frequency interference.

BACKGROUND

Wireless computing platforms may communicate using one or more wireless communication channels. With today's wireless platforms it is not possible to completely avoid platform radio frequency interference (RFI). Platform components typically include clocks that, during operation, may generate harmonics that overlap with the frequency range of at least one wireless channel. In some platforms, the close proximity of the clocks and wireless transceivers may introduce significant RFI with one or more wireless channels. The effect of the RFI may be to significantly reduce the bandwidth and/or operating range of the wireless channel.

If a system clock's fundamental frequencies are adjusted such that one radio channel is free of interfering harmonics, another radio channel may be severely degraded. Currently system clock spreads are not adaptively adjustable for best radio performance based on radio frequency measurements. No existing mobile computing platforms make use of spectral measurements to adaptively minimize interference of system clock harmonics on radio communication via narrowband spectral analysis.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to adaptive control of clock spread to mitigate radio frequency interference.

As mobile computers become thinner and thinner, for example, and more and more radios are added to the system (for example, wireless LAN, Blue Tooth, 3G, WiMax, etc.) more and more interference may occur between the radios and system clocks of the computing platform. This is particularly true, for example, between a radio antenna on a lid of the laptop and an LCD controller for the display on the lid that are in close proximity to each other.

Some display panels may generate pixel clock sub-harmonics (for example, displays in a mobile computing platform). A reduction of radio frequency interference (RFI) can be used in some embodiments to result in greater wireless network range or greater wireless network throughput, for example. In such a manner, according to some embodiments, streaming video will look better, voice over internet protocol (VoIP) will sound clearer, and downloads will happen faster, for example.

Figure 1A:
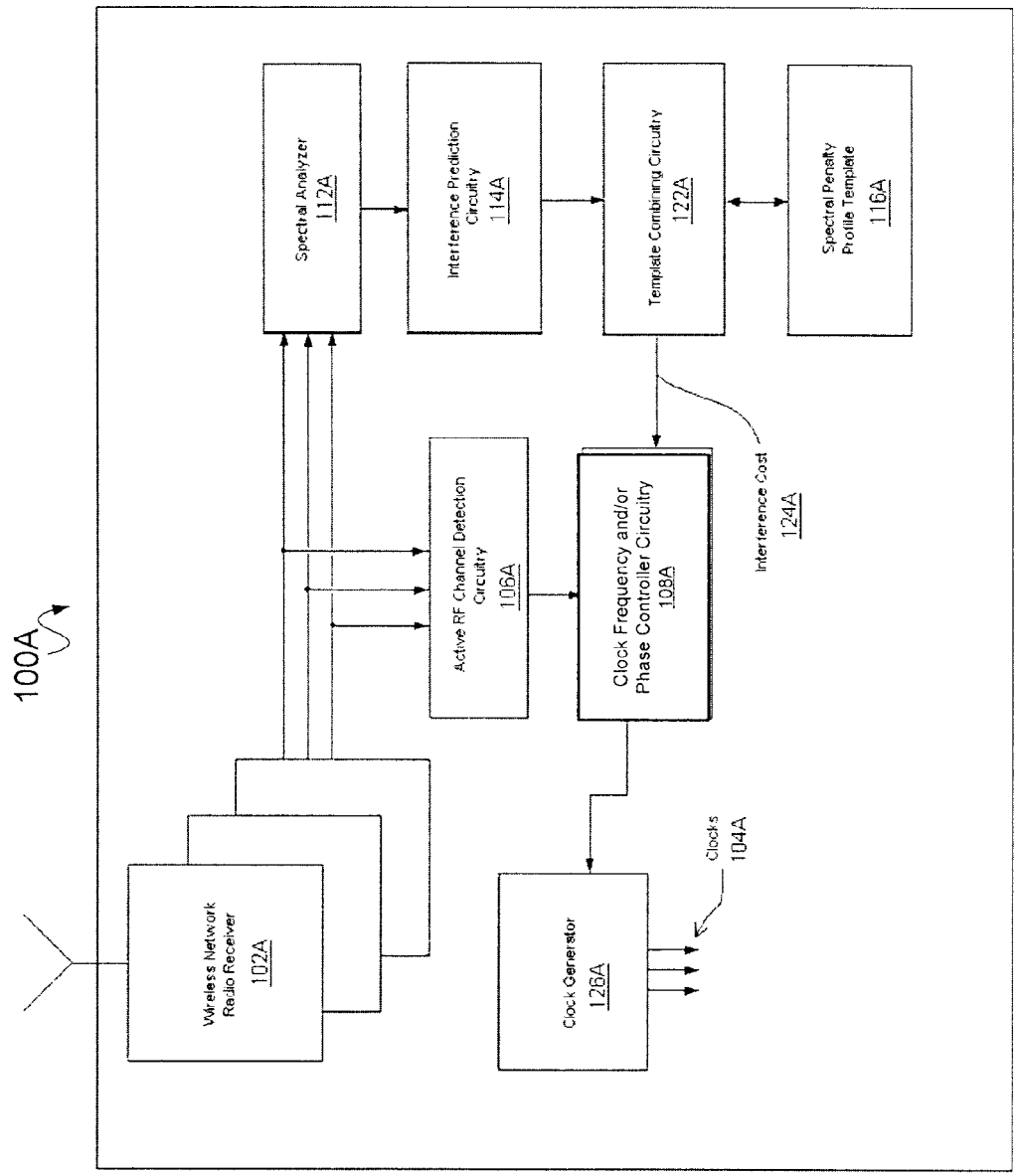
FIG. 1A illustrates a system that may be used in implementing some embodiments of the inventions.

FIG. 1A provides a block diagram of a wireless system 100A consistent with the present disclosure. The wireless system 100A may include a wireless platform, for example, a laptop computer, Palm® computer, Treo® handheld computer, cell phone, global positioning system (GPS), etc. Wireless system 100A may include at least one wireless network radio receiver 102A and at least one clock 104A, generated by clock generator 126A. The at least one wireless network radio receiver 102A may be configured for wireless communication using, for example 802.11a/b/g, BlueTooth, UWB, WiMax, and/or other wireless communication protocols. Each of these communication protocols may operate over a designated RF band (frequency range) and each RF band may include one or more possible active channels within the RF band. Accordingly, each wireless communication receiver 102A may be configured to receive at least one RF channel within at least one RF band.

Clocks 104A may include any system or sub-system clock, which may include, for example, CPU clock, memory clock, display clock, bus clock, and/or other system or subsystem clock etc. Thus, the term "clock" as used herein is intended to broadly cover any clock and/or strobe (for example bus strobe) associated with system 100A.

The wireless system 100A may also include active radio frequency (RF) channel detection circuitry 106A, clock frequency and/or clock spread controller circuitry 108A, spectral analyzer circuitry 112A, and interference prediction circuitry 114A. In this embodiment, the frequencies, amplitudes, and spectral shapes of interfering clock harmonics are estimated by spectral analysis block 112A. Based on these estimated quantities, the interference prediction block 114A predicts the frequency, amplitudes, and spectral shapes of interfering clock harmonics for one more new fundamental frequencies of the clocks. The predicted interference spectra are weighted by applying spectral penalty templates 116 in the template combiner 122A. The instantaneous interference cost for each potential new clock fundamental frequency and/or spread is calculated by the clock frequency and/or clock spread controller 108A using the weighted, predicted interference spectra.

The system clock frequencies and/or spreads that minimize the total interference cost are calculated using methodology such as that described later herein, and are then chosen as target frequencies and/or spreads and reported to clock generator 126A. The clock generator is instructed to then shift the frequencies and/or modify the spread of system clocks 104A to the new target fundamental frequencies.

The active channel detection circuitry 106A may be configured to detect one or more active RF channels associated with one or more wireless network radio receivers 102A. As will be described in greater detail below, to reduce or eliminate RFI (noise) stemming from the harmonic content of at least one clock 104A, clock frequency and/or spread controller 108A may be configured to adjust the frequency and/or spread of at least one clock 104A based on, for example, the current active channel information. The clock frequency and/or spread controller may have hysteresis or smoothing circuitry to prevent oscillation of the clock fundamental frequency and/or spread over time.

Initially, platform radio frequency interference is received by the radio receiver 102A and converted to digital format, then forwarded to the narrowband spectral analyzer 112A, which extracts the interfering tones in the frequency bands of interest. The spectral template combiner 122A applies a spectral weighting template to the extracted tones which emphasizes tones that will cause the most damage to received signals of interest. The clock controller 108A computes a weighted cost of the interfering tones over the band of interest and determines if system clock fundamental frequency modification will decrease that weighted cost. The clock controller determines the system clock fundamental frequencies that result in minimum predicted cost and modifies the system clock generator 126A to move the system clock fundamental frequencies to the desired spectral position. This procedure may occur continuously as other processes in the system (such as power management, wireless network access, etc.) move system clock fundamental frequencies or receiver frequency bands of interest.

Figure 1B:
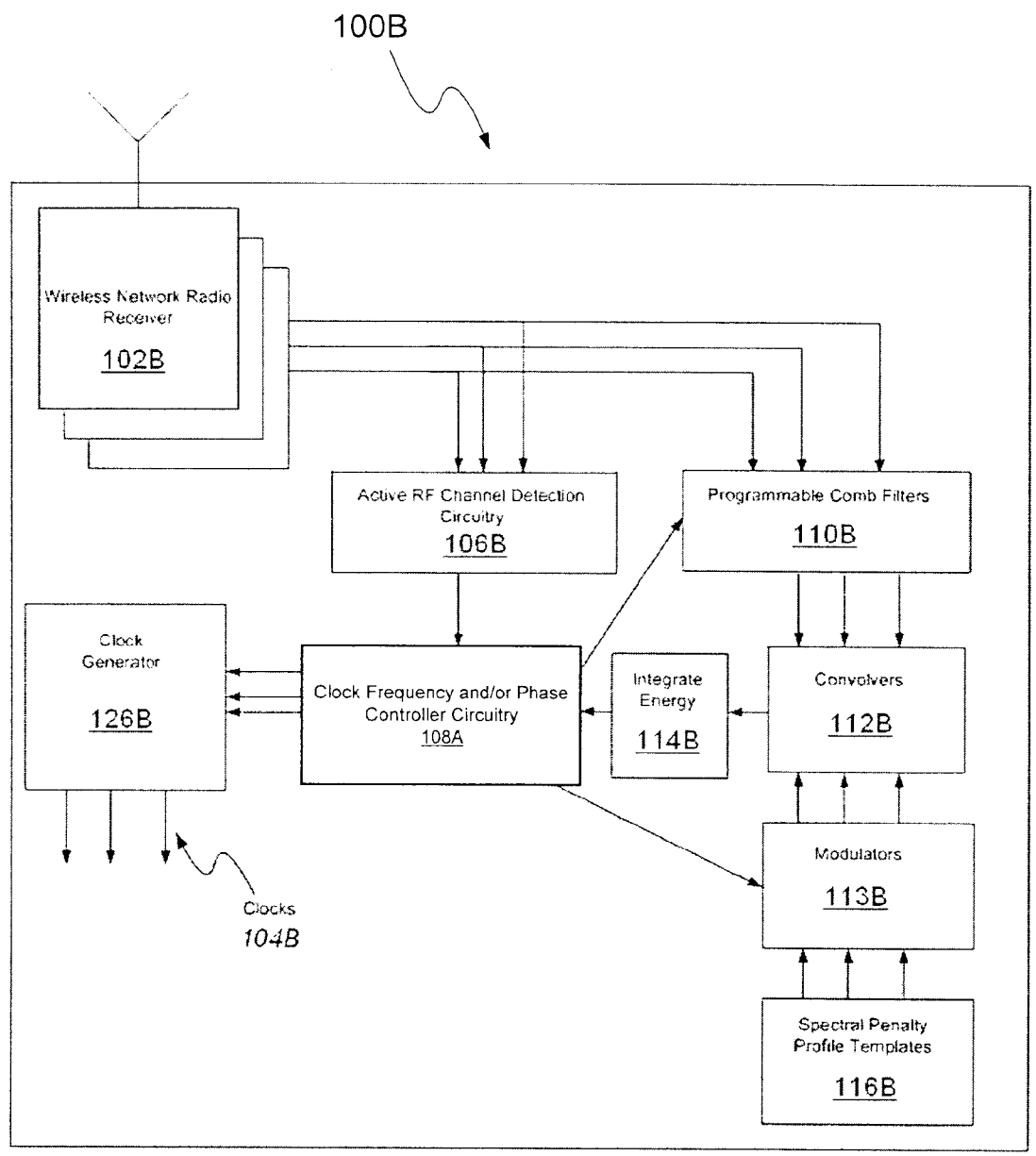
FIG. 1B illustrates a system that may be used in implementing some embodiments of the inventions.

A second wireless system 100B consistent with the present disclosure is shown in FIG. 1B, including an adaptive comb filter 110B. As in the first system, wireless system 100B may also include a wireless platform, for example, a laptop computer, Palm® computer, Treo® handheld computer, cell phone, global positioning system (GPS), etc. Wireless system 100B may include at least one wireless network radio receiver 102B and at least one clock 104B, generated by clock generator 126B. The at least one wireless network radio receiver 102B may be configured for wireless communication using, for example 802.11a/b/g, BlueTooth, UWB, WiMax, and/or other wireless communication protocols.

Similar to the first system, each of these communication protocols of system 100B may operate over a designated RF band (frequency range) and each RF band may include one or more possible active channels within the RF band. Accordingly, each wireless communication receiver 102B may be configured to receive at least one RF channel within at least one RF band. Also as in the first system, clocks 104B may include any system or sub-system clock, which may include, for example, CPU clock, memory clock, display clock, bus clock, and/or other system or subsystem clock etc. Thus, the term "clock" as used herein is intended to broadly cover any clock and/or strobe (for example bus strobe) associated with system 100B.

The wireless system 100B may also include active radio frequency (RF) channel detection circuitry 106B, clock frequency and/or clock spread controller circuitry 108B, convolvers 112B, modulators 113B and integrate energy circuitry 114B. The system clock frequencies and/or spreads that minimize the total interference cost are calculated using methodology such as that described later herein, and are then chosen as target frequencies and/or spreads and reported to clock generator 126B. The clock generator is instructed to then shift the frequencies and/or modify spreads of system clocks 104B to the new target fundamental frequencies.

The clock frequency and/or clock spread controller 108B sets the bandwidth and placement of the teeth of the comb filter to correspond to the expected locations of system clock harmonics. The width of the teeth of the comb filter 110B may vary depending on the expected bandwidth or spread of the system clock harmonics.

The resulting filtered output contains energy primarily at the expected locations of the interfering clock harmonics. If the outputs of the programmable comb filters 110B are spectrally weighted by convolving them with the time-domain spectral templates 116B using convolver 112B, and the energy of the resulting signals is calculated 114B, the result may include an indication of the severity of the interference to the active channels before clocks are shifted. To predict the severity of the interference after a clock shift and/or spread change, the time-domain spectral penalty templates may be modulated and/or comb filter tooth width changed. With properly constructed spectral penalty templates, this is approximately equivalent to shifting the clocks but without the system impact associated with a succession of rapid clock shifts. The modulators 113B shift the spectral penalty templates in increments corresponding to the clock fundamental frequency steps over which the search for optimal shift is taking place. The programmable comb filters 110B modify the comb filter tooth widths in increments corresponding to the clock spreads over which the search for optimal spread is taking place. In this way, the search for optimal clock frequencies and/or spreads is made without ever having to change the clock frequencies. The clock frequency controller circuitry 108B directs the search by providing spacing and tooth widths to the programmable comb filters 110B and by setting the modulation frequency of the modulators 113B. The search may be performed sequentially or simultaneously depending on the desired accuracy and computational resources available. The system clock frequencies that minimize the total predicted interference energy are then chosen as the target frequencies and reported to clock generator 126B. The clock generator is instructed to then shift the frequencies and/or change the spread of system clocks 104B to the new targets.

FIGS. 1A and 1B have been illustrated herein as including clock generators (for example, clock generators 126A and/or 126B). In some embodiments integrated clock generators may be implemented. In some embodiments a separate component and/or system of components and/or a function of a larger multi-function component may be used to implement clock generation (for example, in some embodiments, using a chipset and/or a microprocessor).

In some embodiments such as those illustrated in FIGS. 1A and/or 1B, an external system clock may be used. In some embodiments clock functionality is implemented partially or completely within a multi function component and/or across several components. In some embodiments the clock generator is a discrete component. In some embodiments the clock generator is integrated with other system components. In some embodiments the clock generator is distributed among system components.

Embodiments have been described above as including elements illustrated in FIGS. 1A and 1B and in related description thereof. However, according to some embodiments radio frequency interference (RFI) of clock harmonics upon radio antennas of a computing platform (for example, a mobile computing platform) is addressed. According to some embodiments, one or more radio receivers, an adaptive clocking controller, and/or a programmable clock generator may be used. In some embodiments a modified graphics controller may also be used.

Figure 2:
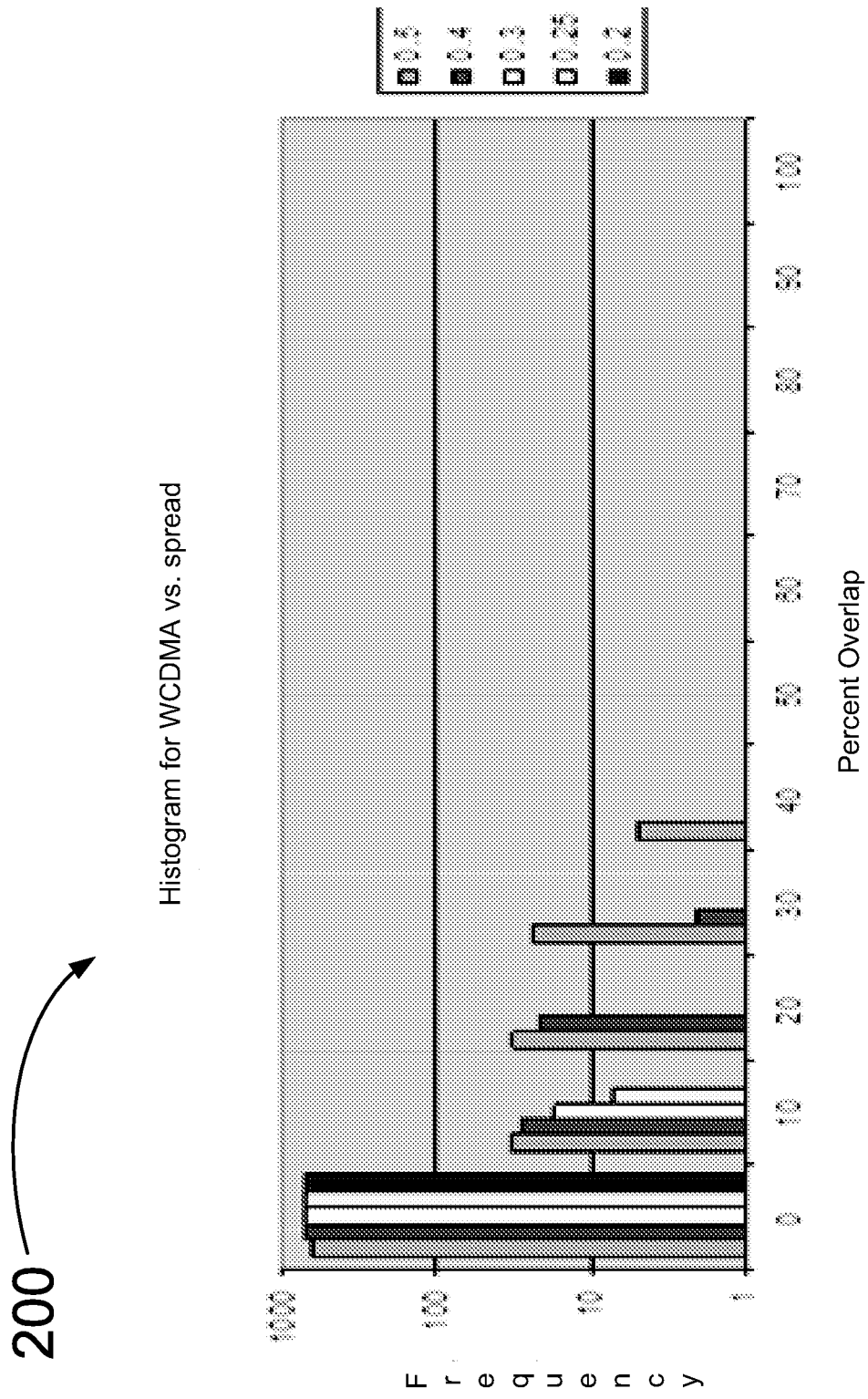
FIG. 2 illustrates a graph to illustrate advantages of some embodiments of the inventions.

FIG. 2 illustrates a graph 200 according to some embodiments. Graph 200 illustrates frequency of occurrence vs. percent channel overlap for adaptive clocking interference mitigation technology such as cellular radio technology of Intel Corporation, and as described, for example, in U.S. patent application Ser. No. 11/169,365 filed on Jun. 28, 2005 (and/or U.S. Patent Publication US-2006-0290434-A1), and/or described, for example, in U.S. patent application Ser. No. 11/537,635 filed on Sep. 30, 2006. Solutions described in those patent applications can be used to completely mitigate interference due to clock harmonics on most display panels, resolving an issue, for example, relating to carrier certification. However, on panels where sub-harmonics are present such implementations may not completely remove interference when spread is enabled on the platform. That is, in such cases, adaptive clocking alone may be insufficient, and embodiments of the present invention may be used to overcome these issues. As illustrated in FIG. 2, a wide band code division multiple access (WCDMA) scenario (for example, with 728 radio channels, sub-harmonic case, and one pair of pixel frequencies of 63.776/2 and 63.095/2 MHz) is illustrated. For the case of 0.5% downspread, there are 93 channels for which at least one of the two clock harmonics overlap with the channel (for example, by up to 40%). The number of channels with overlap is reduced to 52 for a spread of 0.4%, and reduced to 18 for a spread of 0.3%. The number of channels with overlap is reduced to 7 for a spread of 0.25%, and is reduced to zero for a spread of 0.2%. Therefore, the present inventors identified that an optimization scheme that adaptively adjusts spread can be used to solve such interference issues. Such interference issues with sub-harmonic interferers can occur, for example, on up to ⅓ of display panels using this type of technology.

Figure 3:
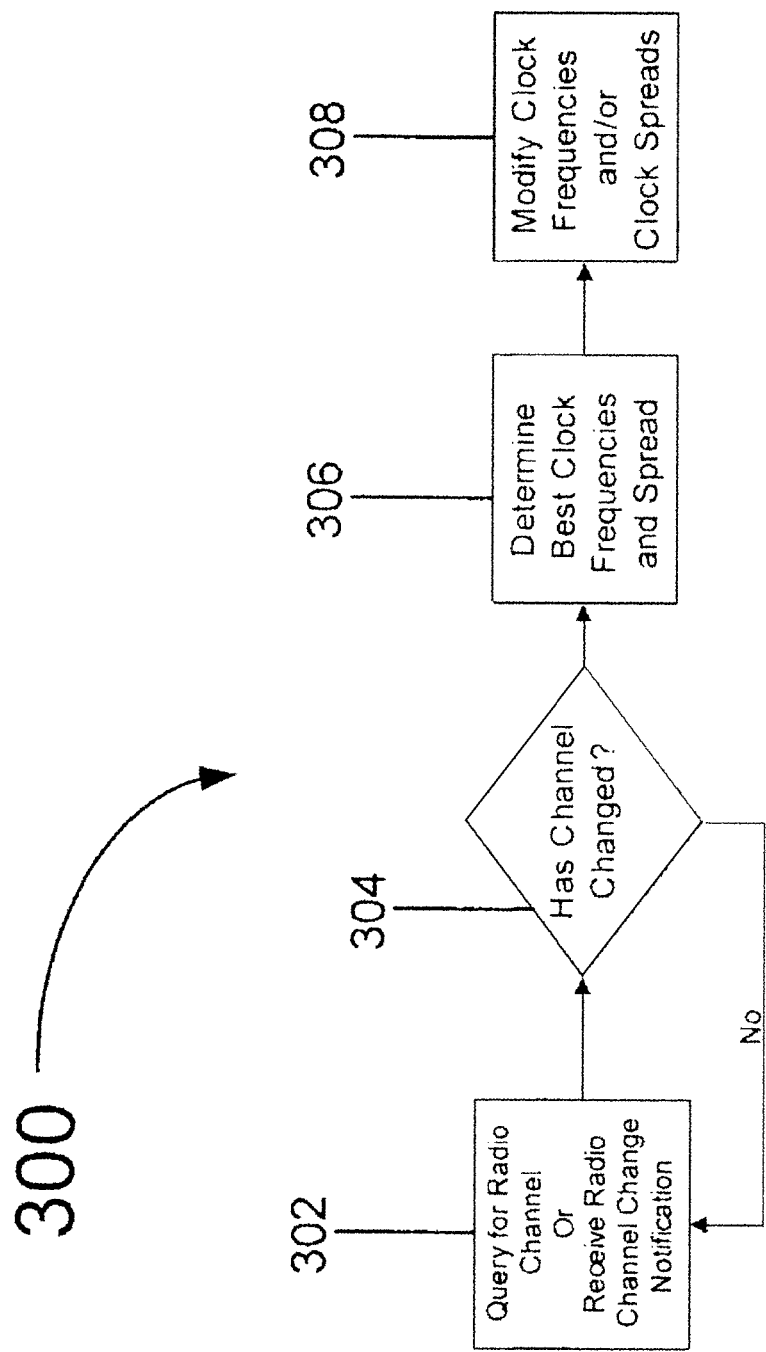
FIG. 3 illustrates a flow according to some embodiments of the inventions.

FIG. 3 illustrates a flow 300 according to some embodiments. In some embodiments flow 300 includes a box 302 to query for a radio channel and/or receive a radio channel change notification. At box 304 a determination is made as to whether the radio channel has changed. If it has not changed, flow returns to box 302. If it has changed, flow moves to box 306 to search for best clock frequencies and spread. Then at box 308 clock frequencies and/or clock spreads are modified, and flow returns to box 302.

Boxes 302 and 304 illustrate a querying or receiving of a notification of a current channel from radio receivers on a platform (for example, according to some embodiments, from radio receivers 102A of FIG. 1A and/or from radio receivers 102B of FIG. 1B). Additionally, box 306 illustrates a determining of best clock frequencies and/or clock spreads. According to some embodiments, this determining is performed using adaptive clocking control (for example, using an adaptive clocking controller such as clock frequency and/or clock spread controller circuitry such as clock frequency and/or clock spread controller circuitry 108A of FIG. 1A and/or clock frequency and/or clock spread controller circuitry 108B of FIG. 1B). According to some embodiments box 206 determines (for example, within an adaptive clocking controller) a combination of:

clock frequencies (for example, one per clock) chosen from among a small set of validated clock frequencies (for example, from two clock frequencies) for each clock, and/or clock spreads (for example, one per clock) chosen from a set of allowable clock spreads for each clock that would result in a lowest total interference. According to some embodiments, box 308 illustrates modifying one or more clock frequencies and/or one or more clock spreads by writing to registers of a programmable clock generator (for example, in some embodiments, a clock generator such as clock generator 126A of FIG. 1A and/or clock generator 126B of FIG. 1B). According to some embodiments, box 308 illustrates modifying one or more clock frequencies and/or one or more clock spreads by writing to one or more modified graphics drivers.

According to some embodiments, determining such as the determining of box 306 may be performed by searching a cost function for its minimum value with respect to fundamental clock frequencies and/or clock spreads. For example, in some embodiments a cost function is used so that determining may be performed by searching a cost function for its minimum value with respect to fundamental clock frequencies and/or clock spreads, where the cost function is calculated as per the following equation and/or similar to the following equation:

$$C(\omega_0, \varphi_{bw}) = \int \sum_{p=1}^{P} \sum_{n=1}^{N_p} \left[ A_{p,n} \Gamma_p \left( \frac{n\omega_{0,p} - \omega}{n\phi_{bw,p}} \right) \right] \left[ \sum_{m=1}^{M} \Pi_m \left( \frac{\omega_{c,m} - \omega}{\omega_{bw,m}} \right) \right] d\omega \quad \text{Equation 1}$$

where
$A_{p,n}$ is the amplitude of the $n^{th}$ harmonic of the $p^{th}$ clock
$\omega_{0,p}$ is the fundamental frequency of the $p^{th}$ clock
$\Pi_m(x)$ is the penalty profile for the $m^{th}$ frequency channel
$\Gamma_p(x)$ is the spread profile for the $p^{th}$ clock
$\omega_{c,m}$ is the center frequency of the $m^{th}$ frequency channel
$\omega_{bw,m}$ is the bandwidth of the $m^{th}$ frequency channel
$\phi_{bw,p}$ is the bandwidth of the $p^{th}$ clock The cost function value $C(\omega_0, \phi_{bw})$ is generally high when interferences are present to the radios, and is generally low when there is little interference to the radios. Further, it is noted that $\Pi_m(x)$ may be viewed as weighting the penalty for interfering in that part of the channel, that $\Gamma_p(x)$ is a weighted area of overlap, and that bw is the bandwidth corresponding to spread. The value $\omega_0$ denotes the P-dimensional set of fundamental frequencies for the P clocks. The value $\phi_{bw}$ denotes the P-dimensional set of clock spreads for the P clocks. The optimization problem may also then be represented according to the following equation:

$$(\omega_0^*, \varphi_{bw}^*) = \arg \min_{\omega_0 \in W, \varphi_{bw} \in \Phi_{bw}} C(\omega_0, \varphi_{bw}) \quad \text{Equation 2}$$

Here, an asterisk "*" denotes that a value is optimal. The "arg" operator denotes that the best arguments are chosen rather than the function value itself. The set W denotes the set of discrete clock frequency values that can be achieved by the programmable clock generator (and/or programmable clock generators). The set $\Phi_{bw}$ denotes the set of discrete spread values that can be achieved by the programmable clock generator (and/or programmable clock generators). The frequencies and/or spreads that minimize the cost are chosen.

In some embodiments Equation 1 and/or Equation 2 need not be exactly the same as set forth herein. For example, all of the Equation 1 and/or Equation 2 and/or a part of the Equation 1 and/or Equation 2 may be implemented (for example, to achieve the same result and/or a very similar result as the exact Equation 1 and/or Equation 2).

FIG. 3 has been illustrated and described as a flow 300. However, it is noted that the elements of FIG. 3 can be implemented according to some embodiments in software, hardware, and/or firmware, for example.

Figure 4A:
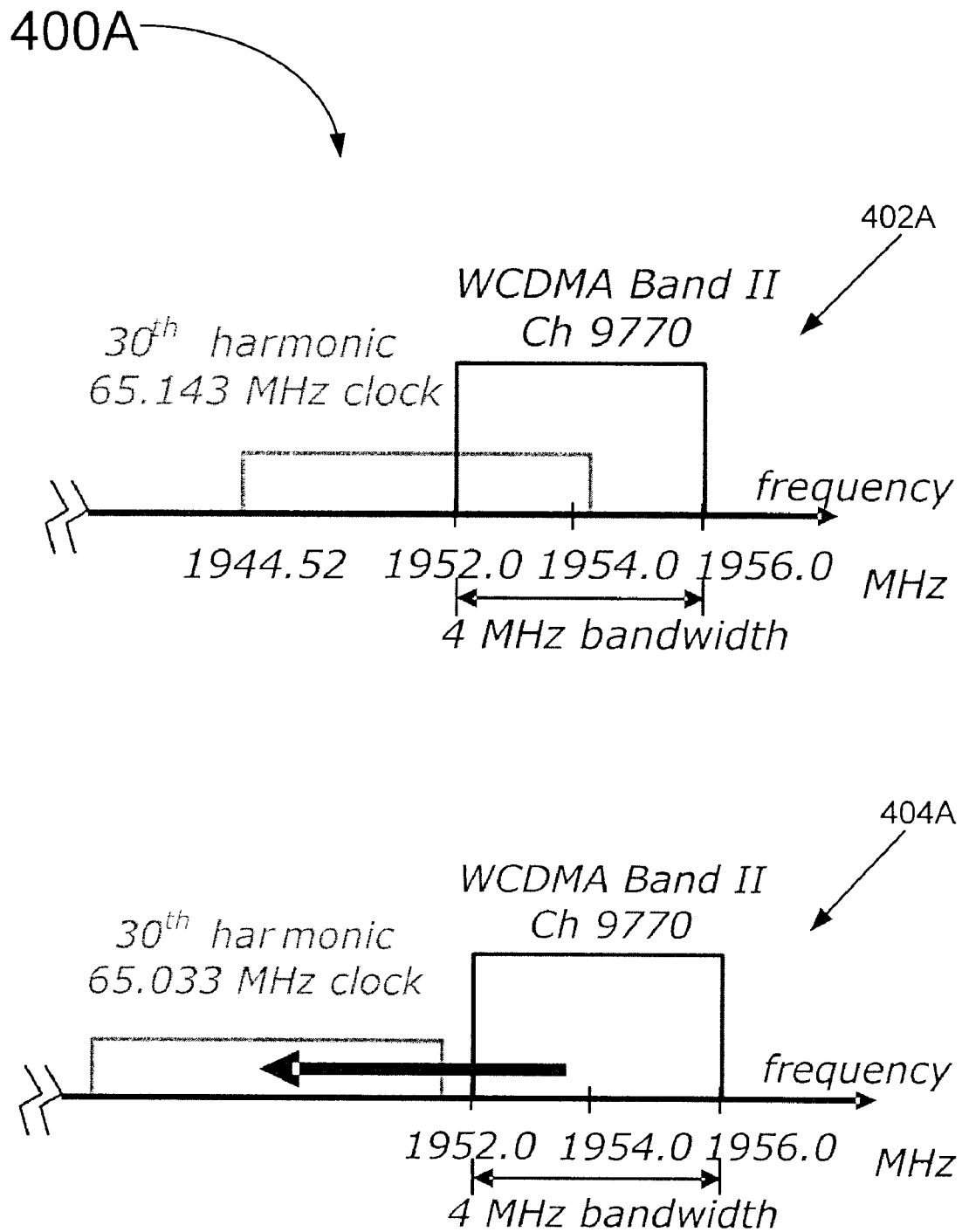
FIG. 4A illustrates a graph according to some embodiments of the inventions.

FIG. 4A illustrates a graph 400A according to some embodiments. Graph 400A illustrates a downspread clock harmonic interfering with an RF channel as illustrated in graph 402A. As illustrated in graph 404A, a clock frequency adjustment is made to mitigate the interference.

Figure 4B:
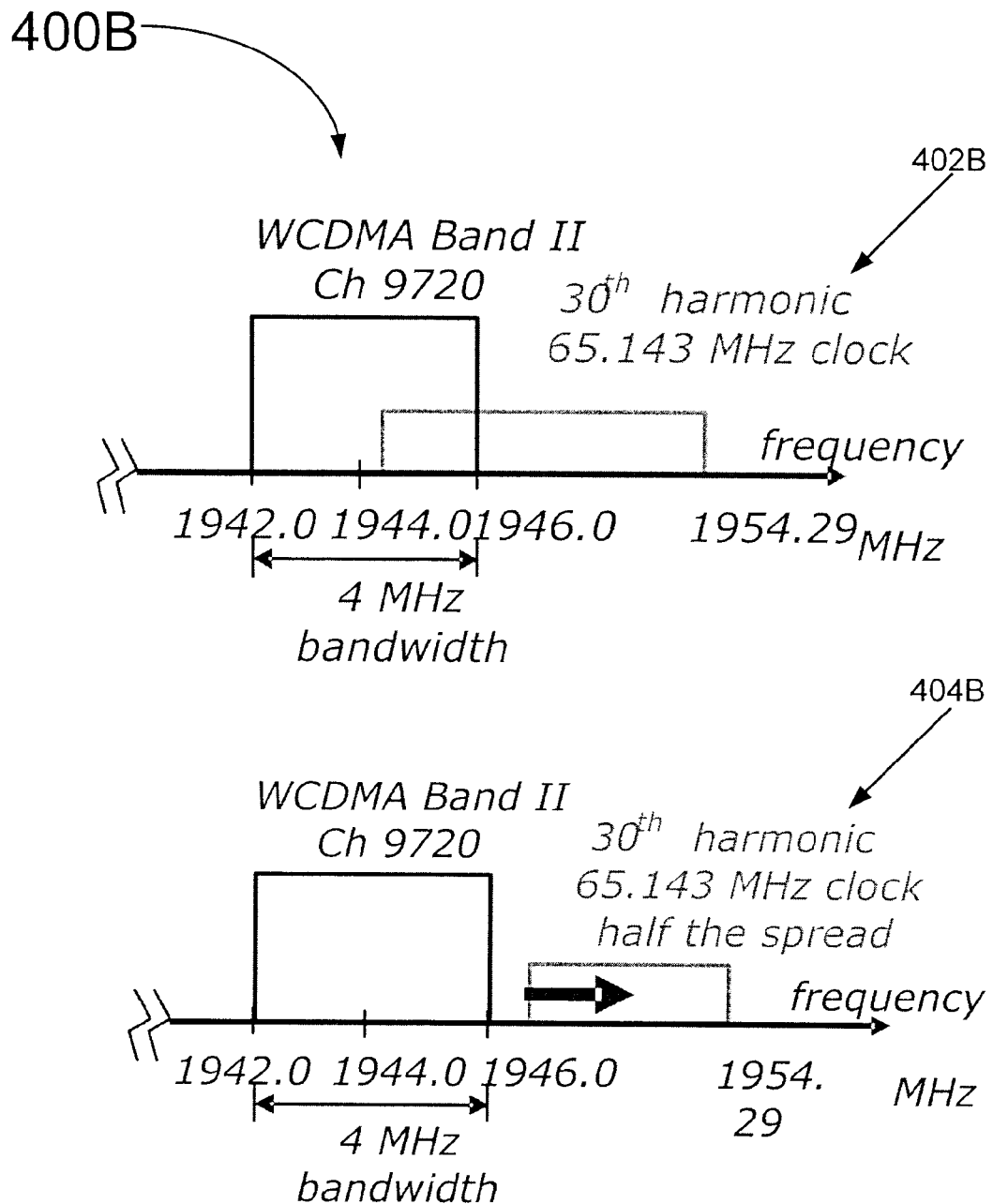
FIG. 4B illustrates a graph according to some embodiments of the inventions.

FIG. 4B illustrates a graph 400B according to some embodiments. Graph 400B illustrates a downspread clock harmonic interfering with an RF channel as illustrated in graph 402B. As illustrated in graph 404B, spread adjustment is made to mitigate the interference. It is noted that the frequency need not be changed in some embodiments, but that the spread is decreased and the same clock frequency may be used.

In operation, and referring again to the system 100 of FIG. 1, active RF channel detection circuitry 106 may be configured to detect one or a plurality of active channels. Clock frequency controller circuitry 108 may be configured to receive the current active channel information (from circuitry 106) and to read the interference cost to determine the optimal clock frequency for a given clock for a given one or a plurality of active channels. Based on the information provided by active RF channel detection circuitry 106 and the template combiner 122, clock frequency controller circuitry 108 may be configured to set the clock frequency of one or more clocks 104 to reduce or eliminate RFI in a given active RF channel, or a given plurality of active RF channels.

This system has the advantage that when new radios are added to the system, the system clocks may be automatically adjusted for minimum interference. Moreover, when new wireless signaling schemes become available, a clock controller firmware update may be all that is needed to ensure continued optimal performance with the new wireless network standards.

This system helps to ensure that future multi-radio computing platforms perform better in terms of extending radio range, minimizing power required to achieve a given range, increasing throughput at a given range, and increasing the number of wireless platforms that can co-exist in a given spatial location without interfering with one another. Moreover, this system ensures low impact of platform RFI upon radio performance.

Advantageously, the systems, methods and apparatus described herein may offer enhanced RFI mitigation over conventional approaches. Further advantageously, the systems, methods and apparatus described herein may provide a comprehensive RFI-reducing scheme by adaptively managing a plurality of system clocks that may cause RFI with one or more active RF channels. Further, the systems, methods and apparatus described herein may take advantage of clock-adjustment including clock frequency and/or clock spread without requiring expensive add-on circuitry and/or shielding which may increase the size and/or overall cost of some wireless platforms.

As stated, the at least one wireless network radio receiver 102A and/or 102B may be configured for wireless communication using, for example 802.11a//b/g, Bluetooth, UWB, WiFi, WiMax, and/or other wireless communication protocols. If an 802.11a/b/g wireless communications protocol is used by one or more wireless network receivers 102, it may comply or be compatible with the protocol described in "ANSI/IEEE 802.11, 1999 Edition", as published by LAN MAN Standards Committee of the IEEE Computer Society (Reaffirmed 12 Jun. 2003). If a Bluetooth wireless communications protocol is used by one or more wireless network receivers 102, it may comply or be compatible with the protocol described in the "802.15.1™ IEEE Standard For Information Technology—Telecommunications and Information Exchange Between Systems—Local and Metropolitan Area Networks," Part 15.1, Version 1.1, published Jun. 14, 2005 by the IEEE Computer Society. If a UWB (Ultra Wideband) wireless communications protocol is used by one or more wireless network receivers 102, it may comply or be compatible with the protocol described in "High Rate Ultra Wideband PHY and MAC Standard," 1$^{st}$ Edition, December 2005, published by EMCA International. If a WiMax wireless communications protocol is used by one or more wireless network receivers 102, it may comply or be compatible with the protocol described in "IEEE 802.16-2004", published Oct. 1, 2004 by the IEEE WiMax Committee. Of course, the communications protocol used by one or more wireless network receivers 102 may comply with earlier and/or later versions of these standards.

One or more of the components of the system of FIGS. 1A and/or 1B may be embodied in one or more integrated circuits (ICs). "Integrated circuit", as used herein, may mean a semiconductor device and/or microelectronic device, such as, for example, a semiconductor integrated circuit chip. "Circuitry", as used in any embodiment herein, may comprise, for example, singly or in any combination, hardwired circuitry, programmable circuitry, state machine circuitry, and/or firmware that stores instructions executed by programmable circuitry.

In some embodiments an adaptive clocking controller determines a clock spread of a system clock that would result in a lowest total interference between a channel received by a radio receiver and the system clock. A clock generator modifies a spread of the system clock in response to the determined clock spread.

In some embodiments a clock spread of a system clock is determined that would result in a lowest total interference between a channel received by a radio receiver and the system clock. A spread of the system clock is modified in response to the determined clock spread.

In some embodiments a system includes one or more radio receivers, an adaptive clocking controller, and a clock generator. The adaptive clocking controller determines a clock spread of a system clock that would result in a lowest total interference between a channel received by a radio receiver and the system clock. The clock generator modifies a spread of the system clock in response to the determined clock spread.

In some embodiments an article includes a computer readable medium having instructions thereon which when executed cause a computer to determine a clock spread of a system clock that would result in a lowest total interference between a channel received by a radio receiver and the system clock, and to modify a spread of the system clock in response to the determined clock spread.

Embodiments of the present disclosure may be implemented in a computer program that may be stored on a storage medium having instructions to program a system (e.g., computer system and/or a machine and/or processor) to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Although some embodiments have been described herein, according to some embodiments these particular implementations may not be required, and/or certain elements may not be required in all embodiments. For example, while some embodiments have been described herein as applying to WCDMA, it is noted that some embodiments apply to other and/or all communications standards and are not limited to WCDMA.

Some embodiments have been described herein as including clock generators and/or clock generation. In some embodiments integrated clock generators may be implemented. In some embodiments a separate component and/or system of components and/or a function of a larger multi-function component may be used to implement clock generation (for example, in some embodiments, using a chipset and/or a microprocessor).

In some embodiments an external system clock may be used. In some embodiments clock functionality is implemented partially or completely within a multi function component and/or across several components. In some embodiments the clock generator is a discrete component. In some embodiments the clock generator is integrated with other system components. In some embodiments the clock generator is distributed among system components.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
an adaptive clocking controller to determine a clock spread of a system clock that would result in a lowest total interference between a channel received by a radio receiver and the system clock; and
a clock generator to modify a spread of the system clock in response to the determined clock spread;
wherein the adaptive clocking controller is to determine the clock spread by searching a cost function for a minimum clock spread value; and
wherein the cost function is calculated according to the following:

$$C(\omega_0, \varphi_{bw}) = \int \sum_{p=1}^{P} \left[ \sum_{n=1}^{N_p} A_{p,n} \Gamma_p\left(\frac{n\omega_{0,p} - \omega}{n\phi_{bw,p}}\right) \right] \left[ \sum_{m=1}^{M} \Pi_m\left(\frac{\omega_{c,m} - \omega}{\omega_{bw,m}}\right) \right] d\omega$$

wherein:
$A_{p,n}$ is the amplitude of the $n^{th}$ harmonic of the $p^{th}$ clock
$\omega_{0,p}$ is the fundamental frequency of the $p^{th}$ clock
$\Pi_m(x)$ is the penalty profile for the $m^{th}$ frequency channel
$\Gamma_p(x)$ is the spread profile for the $p^{th}$ clock
$\omega_{c,m}$ is the center frequency of the $m^{th}$ frequency channel
$\omega_{bw,m}$ is the bandwidth of the $m^{th}$ frequency channel
$\Phi_{bw,p}$ is the bandwidth of the $p^{th}$ clock.

2. The apparatus of claim 1, the adaptive clocking controller further to determine a clock frequency of the system clock that would result in a lowest total interference between the channel received by the radio receiver and the system clock, and the clock generator further to modify the clock frequency of the system clock in response to the determined clock frequency.

3. The apparatus of claim 1, wherein the adaptive clocking controller is to determine the clock spread by choosing a clock spread from a set of allowable clock spreads.

4. The apparatus of claim 2, wherein the adaptive clocking controller is to determine the clock spread and the clock frequency by searching a cost function for a minimum value with respect to a fundamental clock spread and with respect to a fundamental clock frequency.

5. A method comprising:
determining a clock spread of a system clock that would result in a lowest total interference between a channel received by a radio receiver and the system clock;
modifying a spread of the system clock in response to the determined clock spread;
determining the clock spread by searching a cost function for a minimum clock spread value; and
calculating the cost function as follows:

$$C(\omega_0, \varphi_{bw}) = \int \sum_{p=1}^{P} \left[ \sum_{n=1}^{N_p} A_{p,n} \Gamma_p \left( \frac{n\omega_{0,p} - \omega}{n\phi_{bw,p}} \right) \right] \left[ \sum_{m=1}^{M} \Pi_m \left( \frac{\omega_{c,m} - \omega}{\omega_{bw,m}} \right) \right] d\omega$$

wherein:
$A_{p,n}$ is the amplitude of the $n^{th}$ harmonic of the $p^{th}$ clock
$\omega_{0,p}$ is the fundamental frequency of the $p^{th}$ clock
$\Pi_m(x)$ is the penalty profile for the $m^{th}$ frequency channel
$\Gamma_p(x)$ is the spread profile for the $p^{th}$ clock
$\omega_{c,m}$ is the center frequency of the $m^{th}$ frequency channel
$\omega_{bw,m}$ is the bandwidth of the $m^{th}$ frequency channel
$\Phi_{bw,p}$ is the bandwidth of the $p^{th}$ clock.

6. The method of claim 5, further comprising:
determining a clock frequency of the system clock that would result in a lowest total interference between the channel received by the radio receiver and the system clock; and
modifying the clock frequency of the system clock in response to the determined clock frequency.

7. The method of claim 5, wherein the determining is to determine the clock spread by choosing a clock spread from a set of allowable clock spreads.

8. The method of claim 6, further comprising determining the clock spread and the clock frequency by searching a cost function for a minimum value with respect to a fundamental clock spread and with respect to a fundamental clock frequency.

9. A system comprising:
one or more radio receivers;
an adaptive clocking controller to determine a clock spread of a system clock that would result in a lowest total interference between a channel received by the one or more radio receivers and a system clock; and
a clock generator to modify a spread of the system clock in response to the determined clock spread;
wherein the adaptive clocking controller is to determine the clock spread by searching a cost function for a minimum clock spread value; and
wherein the cost function is calculated according to the following:

$$C(\omega_0, \varphi_{bw}) = \int \sum_{p=1}^{P} \left[ \sum_{n=1}^{N_p} A_{p,n} \Gamma_p \left( \frac{n\omega_{0,p} - \omega}{n\phi_{bw,p}} \right) \right] \left[ \sum_{m=1}^{M} \Pi_m \left( \frac{\omega_{c,m} - \omega}{\omega_{bw,m}} \right) \right] d\omega$$

wherein:
$A_{p,n}$ is the amplitude of the $n^{th}$ harmonic of the $p^{th}$ clock
$\omega_{0,p}$ is the fundamental frequency of the $p^{th}$ clock
$\Pi_m(x)$ is the penalty profile for the $m^{th}$ frequency channel
$\Gamma_p(x)$ is the spread profile for the $p^{th}$ clock
$\omega_{c,m}$ is the center frequency of the $m^{th}$ frequency channel
$\omega_{bw,m}$ is the bandwidth of the $m^{th}$ frequency channel
$\Phi_{bw,p}$ is the bandwidth of the $p^{th}$ clock.

10. The system of claim 9, the adaptive clocking controller further to determine a clock frequency of the system clock that would result in a lowest total interference between the channel received by the radio receiver and the system clock, and the clock generator further to modify the clock frequency of the system clock in response to the determined clock frequency.

11. The system of claim 9, wherein the adaptive clocking controller is to determine the clock spread by choosing a clock spread from a set of allowable clock spreads.

12. The system of claim 10, wherein the adaptive clocking controller is to determine the clock spread and the clock frequency by searching a cost function for a minimum value with respect to a fundamental clock spread and with respect to a fundamental clock frequency.

13. An article comprising:
a non-transitory computer readable storage medium having instructions thereon which when executed cause a computer to:
determine a clock spread of a system clock that would result in a lowest total interference between a channel received by a radio receiver and the system clock;
modify a spread of the system clock in response to the determined clock spread;
determine the clock spread by searching a cost function for a minimum clock spread value; and
calculate the cost function as follows:

$$C(\omega_0, \varphi_{bw}) = \int \sum_{p=1}^{P} \left[ \sum_{n=1}^{N_p} A_{p,n} \Gamma_p \left( \frac{n\omega_{0,p} - \omega}{n\phi_{bw,p}} \right) \right] \left[ \sum_{m=1}^{M} \Pi_m \left( \frac{\omega_{c,m} - \omega}{\omega_{bw,m}} \right) \right] d\omega$$

wherein:
$A_{p,n}$ is the amplitude of the $n^{th}$ harmonic of the $p^{th}$ clock
$\omega_{0,p}$ is the fundamental frequency of the $p^{th}$ clock
$\Pi_m(x)$ is the penalty profile for the $m^{th}$ frequency channel
$\Gamma_p(x)$ is the spread profile for the $p^{th}$ clock
$\omega_{c,m}$ is the center frequency of the $m^{th}$ frequency channel
$\omega_{bw,m}$ is the bandwidth of the $m^{th}$ frequency channel
$\Phi_{bw,p}$ is the bandwidth of the $p^{th}$ clock.

14. The article of claim 13, the non-transitory computer readable storage medium further having instructions thereon which when executed cause a computer to:
determine a clock frequency of the system clock that would result in a lowest total interference between the channel received by the radio receiver and the system clock; and
modify the clock frequency of the system clock in response to the determined clock frequency.

15. The article of claim 13, the non-transitory computer readable storage medium further having instructions thereon which when executed cause a computer to:
   determine the clock spread by choosing a clock spread from a set of allowable clock spreads.

16. The article of claim 14, the non-transitory computer readable storage medium further having instructions thereon which when executed cause a computer to:
   determine the clock spread and the clock frequency by searching a cost function for a minimum value with respect to a fundamental clock spread and with respect to a fundamental clock frequency.

* * * * *